(12) United States Patent
Carlson

(10) Patent No.: US 11,006,082 B2
(45) Date of Patent: May 11, 2021

(54) HIGHWAY INFRASTRUCTURE INVENTORY AND ASSESSMENT DEVICE

(71) Applicant: Paul J. Carlson, Greensboro, NC (US)

(72) Inventor: Paul J. Carlson, Greensboro, NC (US)

(73) Assignee: Ennis-Flint, Inc., Greensboro, NC (US)

( * ) Notice: Subject to any disclaimer, the term of this patent is extended or adjusted under 35 U.S.C. 154(b) by 0 days.

(21) Appl. No.: 15/636,597

(22) Filed: Jun. 28, 2017

(65) Prior Publication Data

US 2018/0027215 A1     Jan. 25, 2018

Related U.S. Application Data

(60) Provisional application No. 62/355,444, filed on Jun. 28, 2016.

(51) Int. Cl.
| | |
|---|---|
| *H04N 7/00* | (2011.01) |
| *G06K 9/00* | (2006.01) |
| *H04N 7/18* | (2006.01) |
| *G06Q 50/30* | (2012.01) |
| *G01S 19/13* | (2010.01) |

(52) U.S. Cl.
CPC ......... *H04N 7/183* (2013.01); *G06K 9/00791* (2013.01); *G06K 9/00979* (2013.01); *H04N 7/181* (2013.01); *G01S 19/13* (2013.01); *G06Q 50/30* (2013.01)

(58) Field of Classification Search
CPC .... H04N 7/181; H04N 7/183; G06K 9/00979; G06K 9/00791; G06Q 50/30; G01S 9/00791; G01S 19/13
See application file for complete search history.

(56) References Cited

U.S. PATENT DOCUMENTS

| | | | |
|---|---|---|---|
| 2007/0038338 A1* | 2/2007 | Larschan | G07C 5/008 701/2 |
| 2007/0041614 A1* | 2/2007 | Tanji | G06K 9/00798 382/104 |
| 2007/0132608 A1* | 6/2007 | Votaw | G08G 1/0965 340/903 |
| 2008/0082347 A1* | 4/2008 | Villalobos | G06Q 10/20 705/305 |

(Continued)

*Primary Examiner* — Zhihan Zhou
(74) *Attorney, Agent, or Firm* — Kilpatrick Townsend & Stockton LLP

(57) ABSTRACT

The disclosure provides a method for identifying a transportation infrastructure condition may comprise disposing a smart camera system on a vehicle and installing the smart camera system to the vehicle. The method may further comprise recording data from transportation infrastructure with the smart camera system, transmitting the data to a remote server with the transmitter, analyzing the data on the server, and accessing the data on the server with device. A system for identifying a transportation infrastructure condition may comprise a smart camera system disposed on a vehicle, wherein the smart camera system comprises a camera and transmitter, as well as a server capable to analyze data. A device may be configured to record and collect transportation infrastructure conditions. The camera system may comprise a camera, an electronic control module, a global positioning system, a single board computer, and a dashboard.

14 Claims, 7 Drawing Sheets

(56) References Cited

U.S. PATENT DOCUMENTS

| | | | |
|---|---|---|---|
| 2009/0021385 A1* | 1/2009 | Kelty | B60L 11/1824 340/660 |
| 2010/0001883 A1* | 1/2010 | Koenig | G08G 1/161 340/988 |
| 2011/0094840 A1* | 4/2011 | Sakita | B60L 53/12 191/2 |
| 2012/0194679 A1* | 8/2012 | Nehowig | G06F 1/1626 348/148 |
| 2013/0316737 A1* | 11/2013 | Guba | G08G 1/20 455/456.4 |
| 2014/0334689 A1* | 11/2014 | Butler | G06T 7/001 382/108 |
| 2016/0048810 A1* | 2/2016 | Shimada | G06Q 10/20 702/34 |
| 2016/0093216 A1* | 3/2016 | Lee | G07C 5/02 340/870.11 |
| 2016/0117923 A1* | 4/2016 | Dannenbring | G01C 21/32 340/905 |
| 2016/0247335 A1* | 8/2016 | Daily | G07C 5/0841 |
| 2017/0213084 A1* | 7/2017 | Akselrod | E01C 23/163 |
| 2017/0351263 A1* | 12/2017 | Lambermont | G05D 1/0248 |

* cited by examiner

US 11,006,082 B2

HIGHWAY INFRASTRUCTURE INVENTORY AND ASSESSMENT DEVICE

CROSS-REFERENCE TO RELATED APPLICATIONS

This application is a non-provisional application that claims the benefit of U.S. Application Ser. No. 62/355,444 filed on Jun. 28, 2016, which is incorporated by reference herein in its entirety.

STATEMENT REGARDING FEDERALLY SPONSORED RESEARCH OR DEVELOPMENT

This invention was made with government support under 468690 awarded by the Texas Department of Transportation. The government has certain rights in the disclosure.

BACKGROUND OF THE DISCLOSURE

Field of the Disclosure

The present disclosure may generally relate to adapting an available after-market machine system built for assisted driving, and more specifically, to creating an on-board markings assessment network. Embodiments of the present disclosure may be installed in vehicles to inventory and assess the condition of transportation infrastructure, such as, for example, signs and pavement markings, and then may transmit data to a remote server (e.g., cloud-based). Analytics may be performed on the data and the results may be provided back to the user with "dashboards" that may be available on mobile devices or on computers equipped with a connection to the internet. Additionally, embodiments of the present disclosure may be installed on fleet vehicles to generate fleet sourced data. As the vehicles go about their daily duties, they may collect data which may analyze transportation data.

Background of the Disclosure

Agencies may rely on various methods to inventory and assess transportation infrastructure. For example, for pavement markings, there may generally be two methods used to assess the condition of the pavement markings. One method may be a visual method which may involve a dedicated nighttime trip. Alternatively, agencies may hire a service provider to measure the condition of the markings using specialized equipment that may be expensive and limited to retro reflectivity assessments (daytime visibility may not be considered). This process may be time consuming and may only provide a snapshot of the condition of the markings (usually once per year). The disclosure described herein, may remove the subjectivity of visual inspections, may not require dedicated trips, may provide more frequent results, and may be used to assess both daytime and nighttime performance. These benefits may provide more agencies and other users with much more robust data to make more cost-effective decisions with limited resources.

BRIEF SUMMARY OF SOME OF THE PREFERRED EMBODIMENTS

These and other needs in the art are addressed in one embodiment by a method, a system, and a device for identifying a transportation infrastructure condition. The method may comprise disposing a smart camera system on a vehicle and installing the smart camera system to the vehicle. The smart camera system may comprise a smart camera, a single board computer (SBC), an electric control module (ECM), a global positioning system (GPS), and a transmitter. The method may further comprise recording data from a transportation infrastructure with the smart camera system, transmitting the data to a remote server with the transmitter, analyzing the data on the server, and accessing the data on the server with a device, wherein the device displays the data on a dashboard.

A system for identifying a transportation infrastructure condition may comprise a smart camera system disposed on a vehicle, wherein the smart camera system comprises a camera and a transmitter, as well as a server capable to analyze data.

A camera system configured to record and collect transportation infrastructure condition. The camper system may comprise a camera, an electronic control module, a global positioning system, a single board computer, and a dashboard.

The foregoing has outlined rather broadly the features and technical advantages of the present disclosure in order that the detailed description of the disclosure that follows may be better understood. Additional features and advantages of the disclosure will be described hereinafter that form the subject of the claims of the disclosure. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

For a detailed description of the preferred embodiments of the disclosure, reference will now be made to the accompanying drawings in which.

DETAILED DESCRIPTION OF THE PREFERRED EMBODIMENTS

Figure 1:
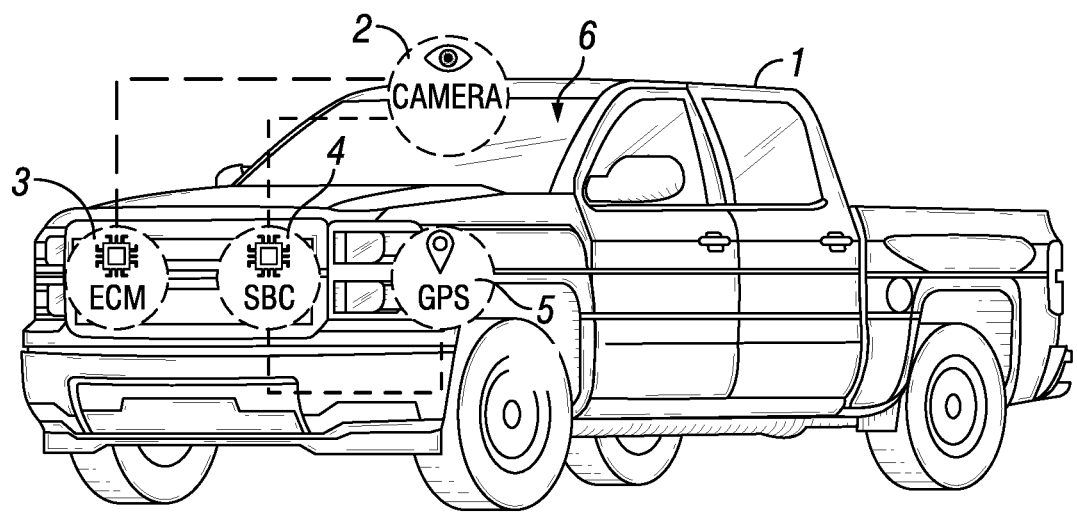
FIG. 1 is a schematic illustration of a smart camera system installed on a vehicle in accordance with embodiments of the present disclosure.

The present embodiments relate to the use of an available after-market machine vision system built for assisted driving which may be adapted with additional equipment to provide benefits for the highway owner-operator. Aftermarket systems may be sold or provided to transportation infrastructure owner/operators/maintainers. Subscriptions to the service (analytics and output) may be used to generate profit.

Adapting an available after-market device built for assisted driving may be installed in vehicles to inventory and assess the condition of pavement markings, which may transmit the data to a off site server. Analytics may be performed and the results may be provided back to a user in easy to use "dashboards" that may be accessible by a mobile device, tablet and/or traditional computers equipped with a connection to the internet. In embodiments, OEM ("Original Equipment Manufacturer") and after-market devices and sensors may be installed in vehicles to assist drivers and improve safety. Also, vehicles may be equipped with sensors and devices to perform specific tests and assessments for the inventory and maintenance condition of assets in the transportation of infrastructure. This disclosure may encompass a process to integrate safety devices, especially camera, lidar and other sensors, for a secondary benefit to inventory and assess the Road Right of Way ("ROW") maintenance. This disclosure primarily may assess pavement markings but also may include other transportation infrastructure assets captured by video, lidar and other sensors. Captured data may then be processed and then presented to users for efficient action and time and money savings for carrying out ROW inventory and maintenance.

This disclosure may cover several elements. Data may be captured via sensors and devices which may be designed for primarily safety applications. The ROW infrastructure and specific condition of the particular assets of interest may be evaluated based on the image with the result reported for maintenance planning. This may save users from having to dedicate specific vehicles to drive roads to acquire this data as a separate process. The data may be integrated with other data and information obtained via the Controlling Area Network bus ("CAN bus") and other sensors, either in a device/appliance or at a server. The data may be converted to information based on analytics and parameters so that the information may be ultimately presented to users for cost effective and directed action, thereby improving asset management with this timely information.

This disclosure may include the application and analytics and processing necessary to assess condition of ROW assets, such as pavement markings, without requiring dedicated vehicles. This disclosure may also implement a network effect whereby many vehicles may provide data from a number of devices rather than vehicles specifically equipped for a specific task. The benefit may be vehicle-sourced continuous data acquisition over time with updates to the condition data further improving maintenance performance and cost efficiency.

This disclosure may be applicable to assessing the condition of road markings and signage, which may be seen via an aftermarket camera installed for safety. Without limitation, this disclosure may also include other items captured by the camera and other sensors, integrating other data from the CAN bus or otherwise, to better assess maintenance condition or changes to other ROW assets.

FIG. 1 illustrates a smart camera system 6 disposed in vehicle 1. Smart camera system 6 is disposed in vehicle 1 anywhere one skilled in the art would deem suitable for the smart camera system 6 to view and assess transportation infrastructure. Smart camera system 6 may include a smart camera 2, an electronic control module (ECM) 3, a single board computer (SBC) 4, a Global Positioning System (GPS) 5 and a transmitter (not pictured). Vehicle 1 may also be equipped with sensors (not pictured). These sensors are either factory sensors and/or installed after vehicle 1 was purchased. These sensors may include, but are not limited to, humidity sensors, temperature sensors, proximity sensors, optical sensors, position sensors, environment sensors, ultrasonic sensor, passive infrared sensor, distance sensor, hall effect sensor, variable reluctance sensor, speed sensors, and the like. The SBC 4 may operate as a motherboard, where data may be stored and may further be configured to allow smart camera system 6 to communicate with sensors, such as but not limited to, humidity sensors, temperature sensors, proximity sensors, optical sensors, position sensors, environment sensors, ultrasonic sensor, passive infrared sensor, distance sensor, hall effect sensor, variable reluctance sensor, speed sensors, and/or the like. The ECM 3 is an embedded system that controls one or more of the electrical systems or subsystems in a transport vehicle. Both SBC 4 and ECM 3 may be disposed anywhere in the vehicle one skilled in the art would deem suitable. The data collected by smart camera system 6 and the sensors may be transmitted to a server 41. A transmitter (not illustrated) may communicate with server 41, discussed below, wirelessly through a computer and/or a cellular network. In examples, the transmitter may directly connect with a computer network. Data from smart camera system 6 may be transmitted in real time to server 41.

Figure 2:
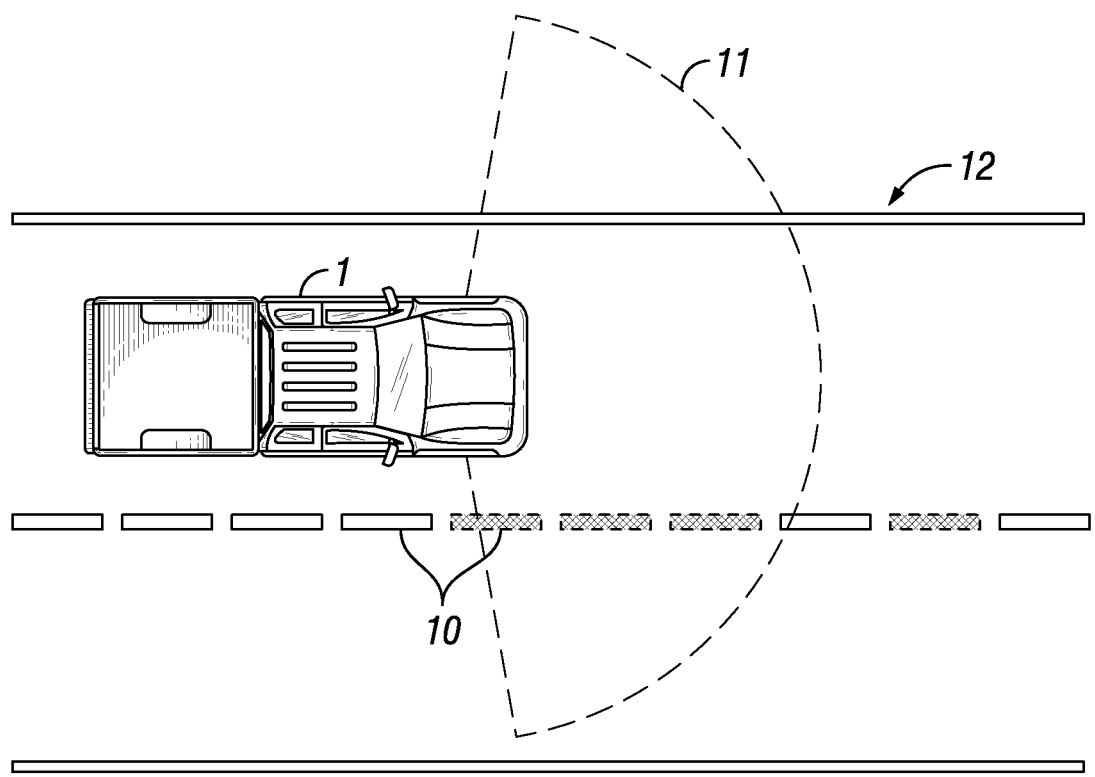
FIG. 2 is a schematic illustration of data being collected at its point of origin in accordance with embodiments of the present disclosure.

FIG. 2 illustrates data being collected at its point of origin. A vehicle 1 that may be equipped with smart camera system 6 and sensors may collect and record data of transportation infrastructure 12. In a non-limiting example, FIG. 2 illustrates vehicle 1 traveling along transportation infrastructure 12. Smart camera system 6 and sensors may utilize many different methods for collecting data. Such techniques may include, but are not limited to video, lidar, and other sensors. As illustrated in FIG. 2 using Lidar, smart camera system 6 may illuminate the transportation infrastructure 12 with a pulsed laser light 11. Pulsed laser light 11 is reflected back and may be measured using a sensor. These measurements may then determine the visibility of transportation infrastructure 12 such as, but not limited to pavement markings 10, identification signs, traffic conditions, and/or the like. This information may be transmitted in real time to server 41 where the information may be compiled and analyzed.

Figure 3:
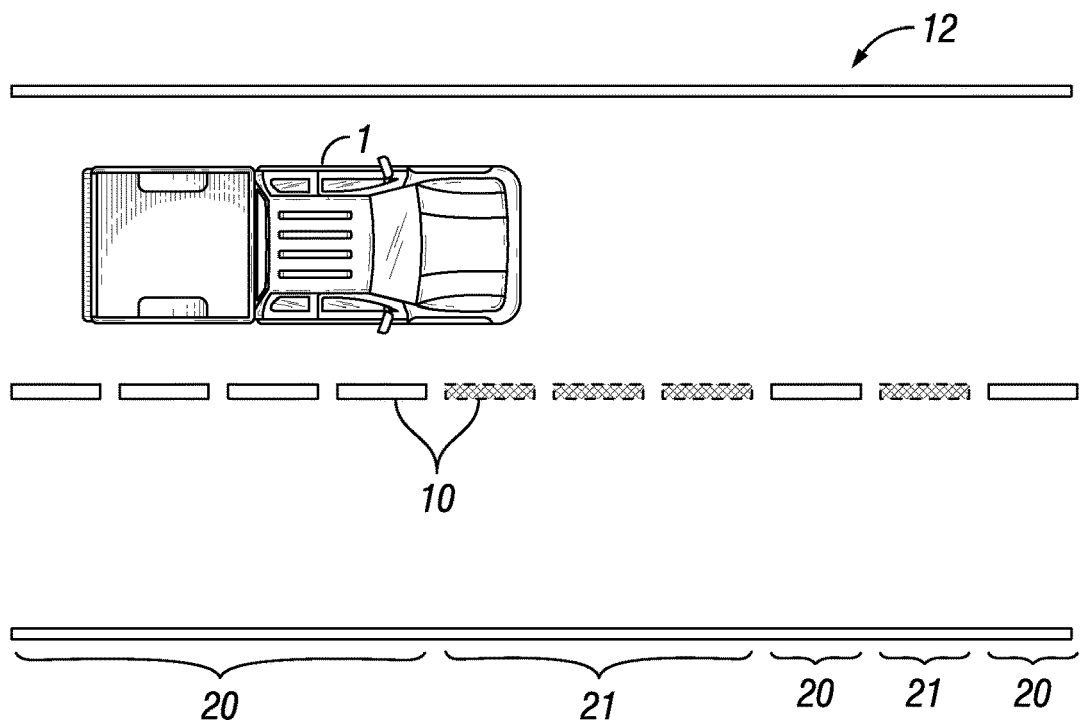
FIG. 3 is a schematic illustration of a camera that may rate the condition of the pavement markings in accordance with embodiments of the present disclosure.

As illustrated in FIG. 3, the transportation infrastructure 12 may then be categorized into sections based on measurements from smart camera system 6. For example, vehicle 1 may be travelling within a transportation infrastructure 12 recording and collecting data. These recordings may identify at least one part of transportation infrastructure 12 as good sections 20 and as bad sections 21. For example, good sections 20 may be defined as visible pavement markings and bad sections 21 may be defined as faint or obscure pavement markings. This is one example of the types of data that may be collected from transportation infrastructure 12. With respect to FIG. 2, other types of data collected pertaining to transportation infrastructure 12 may include, but is not limited to, the infrastructure integrity, visibility of pavement markings 10, signs, weather conditions, traffic conditions, estimated repair costs, daily travel, speed limit, traffic incidents. Weather conditions may further include, temperature, relative humidity, forecast and the like.

Figure 4:
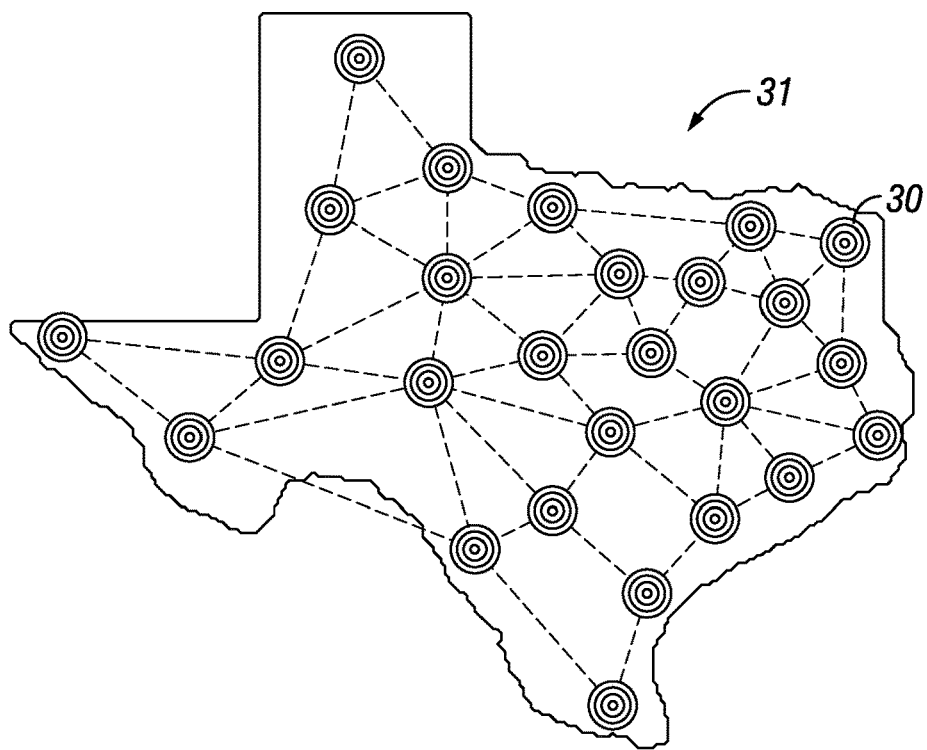
FIG. 4 is a schematic illustration of a data collecting network in accordance with embodiments of the present disclosure.

FIG. 4 illustrates that a fleet of vehicles 1 (reference to FIG. 1), which may be disposed within sectors 30 may generate data over a geographical area 31, which may provide a breakdown of transportation infrastructure 12. Within geographical area 31, the information gathered by the fleet is collected, transmitted to a remote server and/or servers 41 (refer to FIG. 5), compiled, analyzed, and then processed. The data is then displayed on a dashboard 60, as discussed below. Dashboard 60 may be displayed on any device 47, discussed below, capable of accessing server 41. Non-limiting examples of devices 42 which may be capable of accessing server 41 are smart phones, tablets and/or traditional computers.

Figure 5:
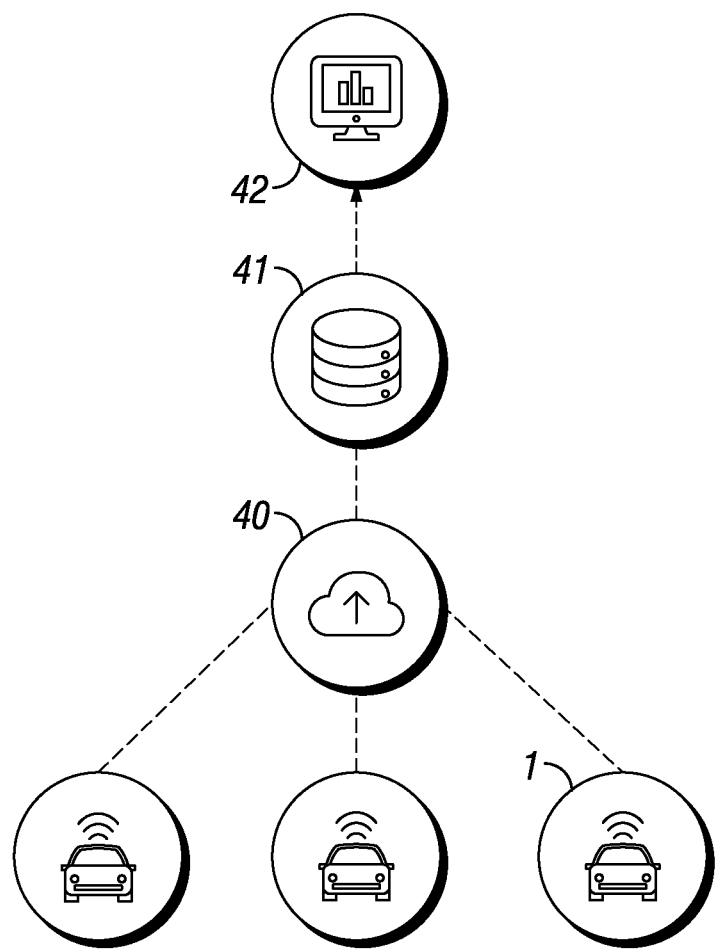
FIG. 5 is a schematic illustration of data which may disclose conditions of the roads in accordance with embodiments of the present disclosure.

FIG. 5 illustrates that data from a plurality of vehicles 1 may send recorded data to HUB 40 which may communicated the recorded data to server 41. Server 41 may analyze and process the data which may be accessed by device 42 which may display conditions of transportation infrastructure 12. Device 42 may produce web based products. The information may be transmitted wirelessly through a computer network, wirelessly through a cellular network or through a direct connection with a computer network. The configured data is then accessible either directly at the server 41 or offsite by device 42 that communicates wirelessly with the server 41 or the data is accessible off site by device 42 that is directly connected to the server 41 through a computer network. The information collected by a plurality of vehicles 1 concerning a geographical region may be sent to a third party. This third party may then use this information as desired. In a non-limiting embodiment, the third party may be a government entity. The government entity may use the collected data to make road improvement and repair decisions. Furthermore, the geographical region may include, but is not limited to, a road, a county, a district, a state, a country, and or any combination thereof.

Figure 6:
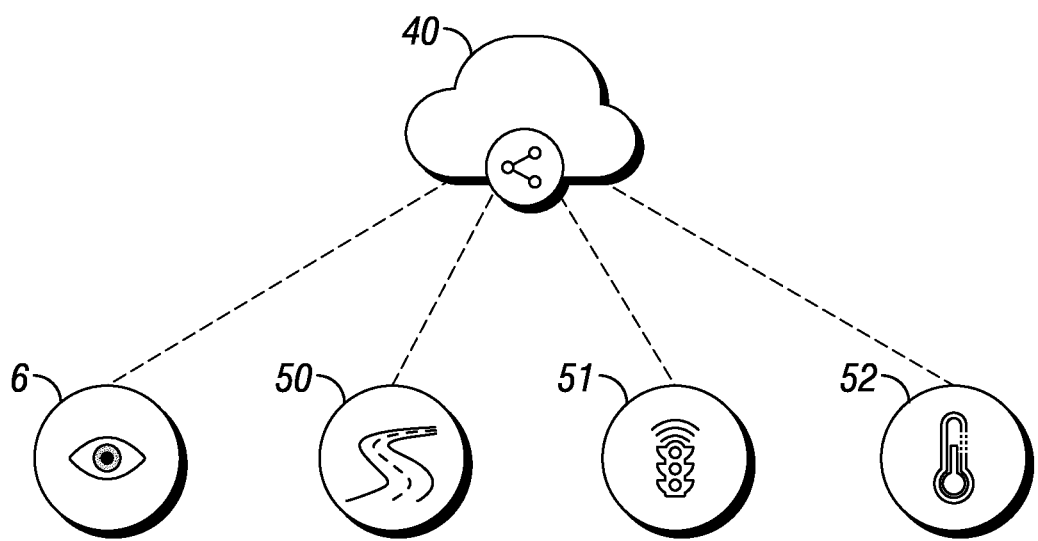
FIG. 6 is a schematic illustration of additional information in accordance with embodiments of the present disclosure.

FIG. 6 illustrates additional information collected by smart camera system 6 that may be disclosed by web based products. With reference to FIG. 5, this information is included in the information that is collected by the vehicles 1 and transmitted to a server and/or servers 41. The additional information may include smart camera systems 6 in vehicles 1, conditions of transportation infrastructure 50, transportation planning and programming traffic counts 51, and weather 52. Conditions of transportation infrastructure may include traffic information, pavement markings, transportation infrastructure signs, and the like. Transportation planning and programming traffic counts include information about traffic such as, but not limited to, when and where traffic normally occurs. Weather includes information including, but not limited to, the dew point, the temperature, the relative humidity, and or the like.

Figure 7:
FIG. 7 is a schematic illustration of a dashboard in accordance with embodiments of the present disclosure.

FIG. 7 illustrates a high level view of the dashboard 60. This view of dashboard 60 may include information such as, but not limited to, integrity breakdown 62, daily travel 63, lane types 64, and/or lane capacity 65. The integrity breakdown 62 may further include, but is not limited to, the percentage of low integrity roads, estimated cost of repair, and/or average road coverage. Daily travel 63 may include information such as, but not limited to, the amount of transportation vehicles that may traverse at least a portion of transportation infrastructure. Lane types 64 may be further broken down into categories including, but not limited to, broken line, double solid line, single solid line, and/or other.

It should be noted that dashboard 60 may be configured to display integrity breakdown 62, daily travel 63, lane types 64, and/or lane capacity 65 device 42 in any suitable configuration.

Figure 8:
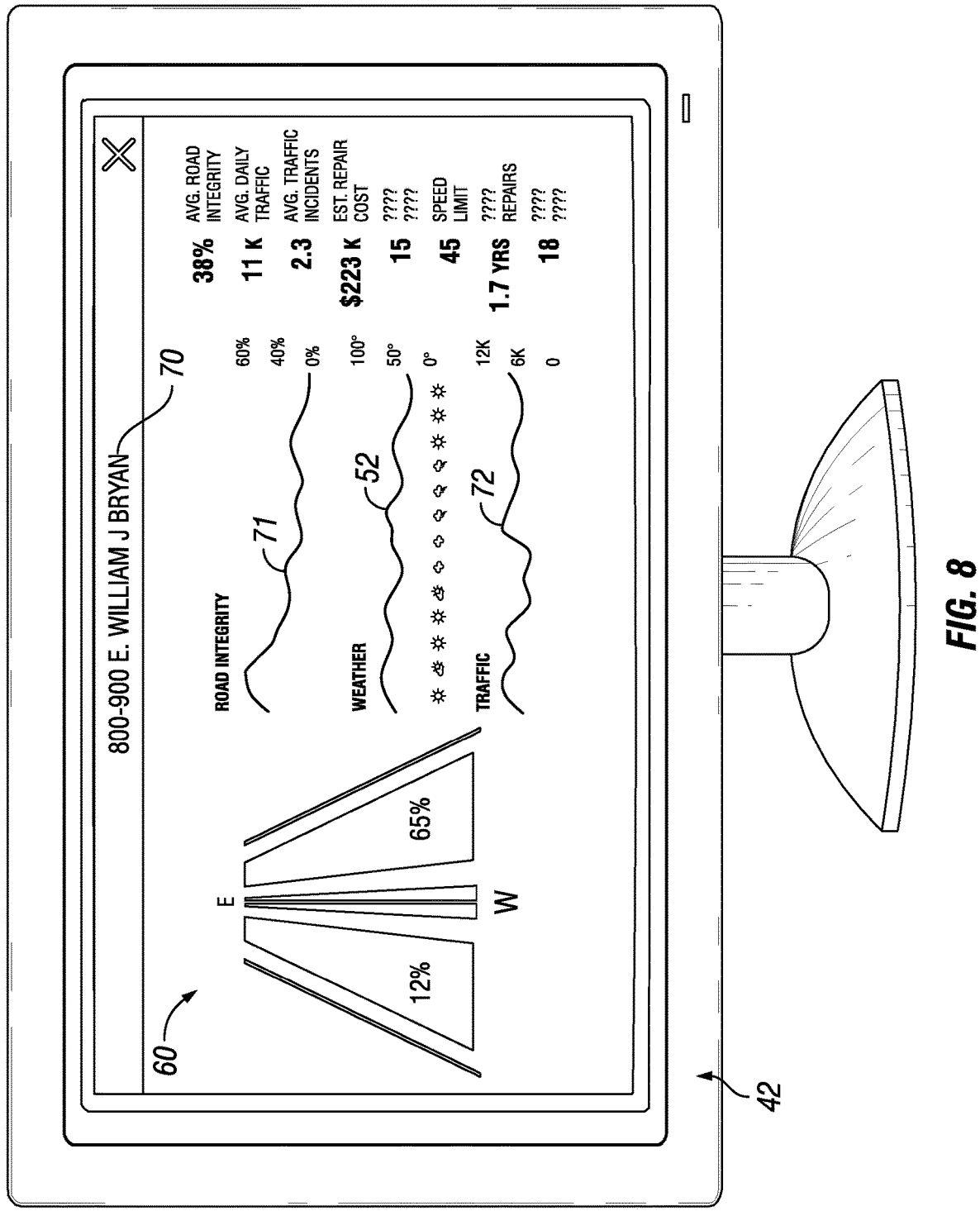
FIG. 8 is a schematic illustration of a dashboard showing location specific details in accordance with embodiments of the present disclosure.

FIG. 8 illustrates a dashboard 60 showing location specific details in accordance with embodiments of the present disclosure. Specific location may include, but is not limited to, a specific road. The information displayed may include, but is not limited to, the name of the road 70 being analyzed, the road integrity 71, the weather conditions 52 and traffic statistics 72. The road integrity 71 may include information such as pavement conditions and or visibility of pavement markings. The weather conditions 52 may include information such as relative humidity, temperature, and/or the projected forecast. Traffic statistics 72 include information such as times and places where traffic is frequent. Information displayed on the dashboard 60 may further comprise the average road integrity, average daily traffic, average traffic incidents, estimated repair costs, customer complaints, speed limit, and time since last repair. It should be noted that dashboard 60 may be displayed on device 42 in any suitable configuration.

Figure 9:
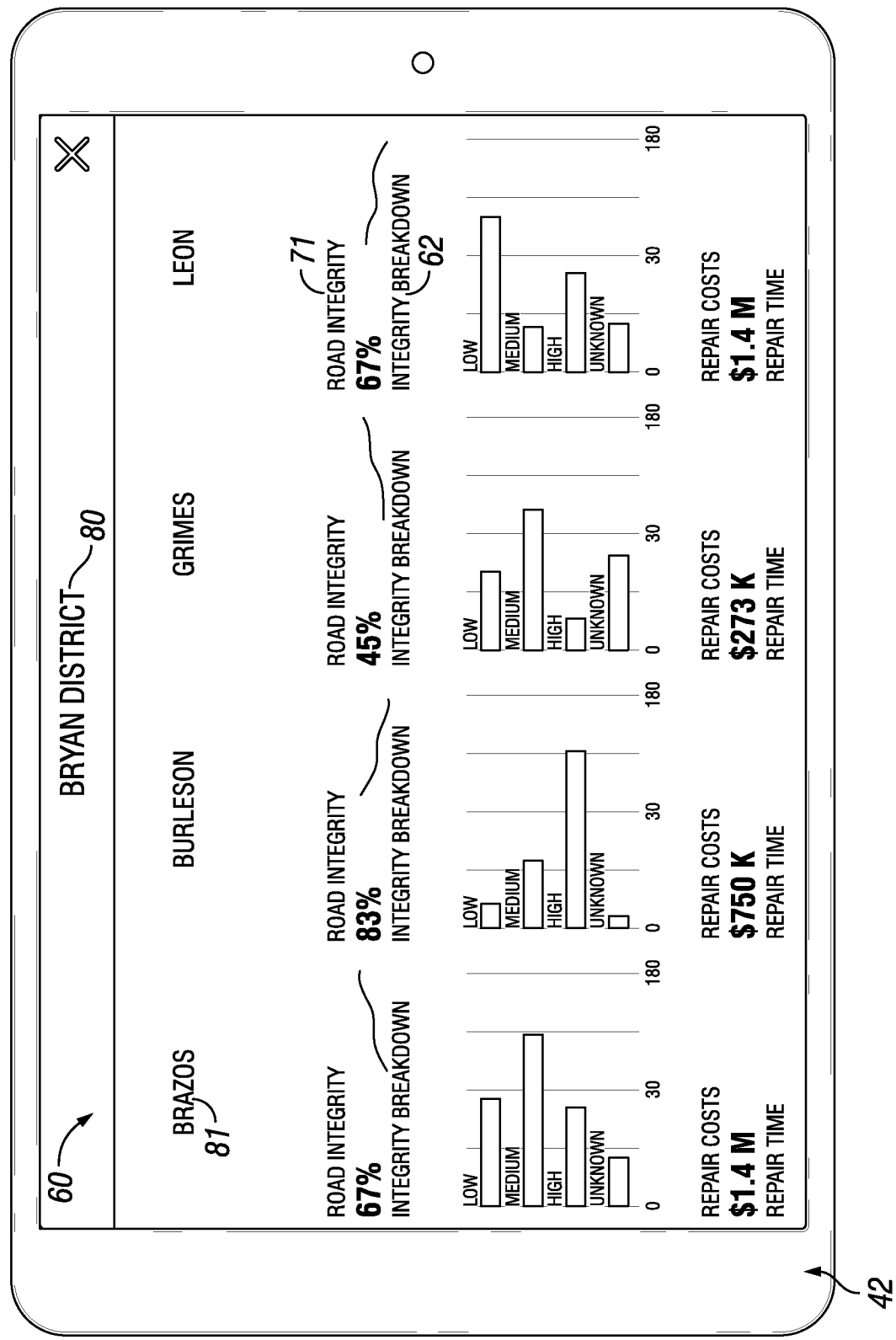
FIG. 9 is a schematic illustration of a dashboard showing At-a-Glance Reporting in accordance with embodiments of the present disclosure.

FIG. 9 illustrates a dashboard 60 showing At-a-Glance Reporting in accordance with embodiments of the present disclosure. Dashboard 60 displays information pertaining to a district 80 broken up by counties 81. Information displayed on dashboard 60 may include, but is not limited to, road integrity 71 and integrity breakdown 62. The road integrity 71 may include information such as pavement conditions and or visibility of pavement markings. Integrity breakdown 62 may break down the roads traveled according to their integrity ranking, such as good, moderate, bad, and/or other. Information displayed on dashboard 60 may further comprise, but is not limited to, repair costs and repair time. It should be noted that dashboard 60 may be displayed on device 42 in any suitable configuration.

Figure 10:
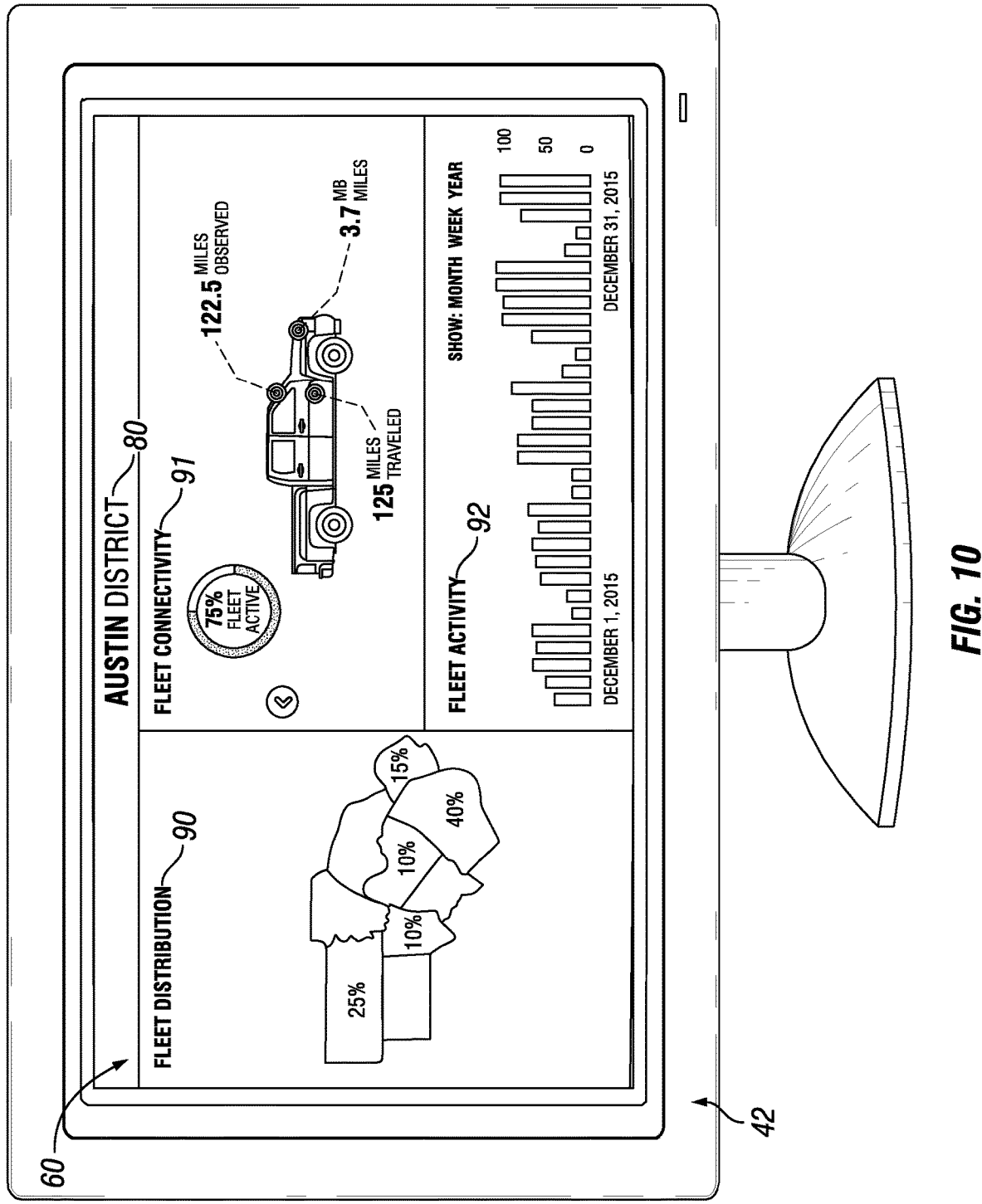
FIG. 10 is a schematic illustration of a dashboard showing Fleet Analytics in accordance with embodiments of the present disclosure.

FIG. 10 illustrates a dashboard 60 showing Fleet Analytics in accordance with embodiments of the present disclosure. This dashboard 60 may display information pertaining to fleet activity 92 over district 80. This dashboard 60 may display information including, but not limited to, fleet connectivity 91, fleet distribution 90 and fleet activity 92. Fleet connectivity 91 may be further broken down into categories including, but not limited to, miles traveled, miles observed, and/or the percentage of the fleet that was active over district 80. Fleet distribution 90 shows where the fleet traveled and how often. Fleet activity 92 shows how long the plurality of vehicles 1 were active in said geographical area 31. It should be noted that dashboard 60 may be displayed on device 42 in any suitable configuration.

It should be understood that the present disclosure uses the term "sensor" or "sensors" to mean any number of different types of sensors found on a vehicle. It should be noted that these types of sensors may include, but are not limited to humidity sensors, temperature sensors, proximity sensors, optical sensors, position sensors, environment sensors, ultrasonic sensor, passive infrared sensor, distance sensor, hall effect sensor, variable reluctance sensor, speed sensors and the like.

Although the present disclosure and its advantages have been described in detail, it should be understood that various changes, substitutions and alterations may be made herein without departing from the spirit and scope of the disclosure as defined by the appended claims.

What is claimed is:

1. A computing system comprising:
   a wireless transceiver; and a processor configured to:
receive, via the transceiver and from two or more transportation infrastructure analysis systems located in two or more districts, a classification of pavement markings in each district, wherein a classification for each district is determined by analyzing a measurement of light received from a camera in each district, and wherein the classification for each district indicates an assigned integrity level of the pavement markings in each district;
determine, for each of the pavement markings, a lane type, wherein the lane type is of a predefined set of lane types comprising a single solid line, a single broken line, and a double line;
visualize on a user interface, based on the classification of pavement markings for each district, a distribution of at least one assigned integrity level of the pavement markings in each district;
visualize the determined lane types on the user interface; and
update, based on subsequent classifications and on the user interface, the distribution of at least one assigned integrity level of the pavement markings in each district.

2. The computing system of claim 1, wherein the processor is further configured to receive, from the transportation infrastructure analysis systems, location data, and visualize the location data on the user interface by district.

3. The computing system of claim 1, wherein the processor is further configured to:
determine, for each of the pavement markings, a respective marking type;
visualize the marking type in an additional area of the user interface.

4. The computing system of claim 3, wherein the types of markings comprise at least one of longitudinal lane markings, crosswalk markings, highway identification markings, or directional markings.

5. The computing system of claim 1, wherein the processor is further configured to determine, from the measurement of light, an estimated repair cost and visualize, on the user interface, the estimated repair cost.

6. A computing system comprising:
a processor configured to:
receive, at a first time and from a first transportation infrastructure analysis system located in a district, a first classification of a set of pavement markings, wherein the first classification is determined by analyzing a first measurement of light received from a first camera, and wherein the first classification indicates that the set of pavement markings is associated with a first assigned integrity level;
determine, for each set of the pavement markings, a lane type, wherein the lane type is of a predefined set of lane types comprising a single solid line, a single broken line, and a double line;
create, based on the first classification and on a user interface, a visualization indicating the district as comprising pavement markings that are of the first assigned integrity level, wherein the visualization comprises, in a first area of the user interface, a chart illustrating a distribution of the assigned integrity level of the district and in a second area of the user interface, the determined lane types;
receive, at a second time later than the first time, a second classification of the set of pavement markings, wherein the second classification is determined by analyzing a second measurement of light received from the first camera or a second camera, and wherein the second classification indicates that the set of pavement markings is associated with a second assigned integrity level, the second assigned integrity level being the same as the first assigned integrity level or different from the first assigned integrity level, and wherein the second classification is from the first transportation infrastructure analysis system or a second transportation infrastructure analysis system located in the district; and
update, based on the second classification and on the user interface, the visualization to indicate the district as comprising pavement markings that are of the second assigned integrity level.

7. The computing system of claim 6, wherein the processor is further configured to identify at least one missing or defective pavement marking within the set of pavement markings.

8. The computing system of claim 6, wherein the processor is further configured to:
receive a classification of transportation infrastructure signs located in the district, wherein the classification of transportation infrastructure signs is determined from the analysis of the measurement of light received from the first or second camera, and wherein the classification of transportation infrastructure signs indicates that the transportation infrastructure signs are associated with an assigned integrity level of transportation infrastructure signs; and
update, based on the classification of transportation infrastructure signs and on the user interface, the visualization to indicate the district as comprising transportation infrastructure signs that are of the assigned integrity level.

9. The computing system of claim 6, wherein the processor is further configured to:
receive a classification of non-vehicular pavement markings located in the district, wherein the classification of non-vehicular pavement markings is determined from the analysis of the measurement of light received from the first or second camera, and wherein the classification of non-vehicular pavement markings indicates that the non-vehicular pavement markings are associated with an assigned integrity level of non-vehicular pavement markings, wherein the non-vehicular pavement markings comprise longitudinal bicycle lane markings and crosswalk markings; and
update, based on the classification of non-vehicular pavement markings and on the user interface, the visualization to indicate the district as comprising non-vehicular pavement markings that are of the assigned integrity level.

10. The computing system of claim 6, wherein the processor is further configured to:
receive, at a third time later than the second time, a third classification of the set of pavement markings, wherein the third classification is determined by analyzing a third measurement of light received from the first camera, the second camera, or a third camera, and wherein the third classification indicates that the set of pavement markings is associated with a third assigned integrity level, the third assigned integrity level being the same as the second assigned integrity level or different from the second assigned integrity level and wherein the third classification is from the first or second transportation infrastructure analysis system, or a third transportation infrastructure analysis system located in the district; and update, based on the third classification and on the user interface, the visualization to indicate the district as comprising pavement markings that are of the third assigned integrity level.

11. The computing system of claim 6, wherein the second classification is from a second transportation infrastructure analysis system located in the district.

12. The computing system of claim 6, wherein the chart comprises a map of the district.

13. The computing system of claim 6, wherein the chart comprises a graph of each integrity level.

14. The computing system of claim 6, wherein the processor is further configured to receive location data for the set of pavement markings from a GPS receiver, and visualize the location data on the user interface.

* * * * *